US012567013B2

(12) United States Patent (10) Patent No.: US 12,567,013 B2
Wu et al. (45) Date of Patent: Mar. 3, 2026

(54) METHOD AND SYSTEM FOR SOLVING SUBSET SUM MATCHING PROBLEM USING DYNAMIC PROGRAMMING APPROACH

(71) Applicant: JPMorgan Chase Bank, N.A., New York, NY (US)

(72) Inventors: Yufei Wu, London (GB); Parisa Zehtabi, London (GB); Alberto Pozanco, Madrid (ES); Daniel Borrajo, Pozuelo de Alarcon (ES); Daniele Magazzeni, London (GB); Manuela Veloso, New York, NY (US); Michael Cashmore, Stirlingshire (GB); Jie Deng, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 280 days.

(21) Appl. No.: 18/208,608

(22) Filed: Jun. 12, 2023

(65) Prior Publication Data

US 2024/0412134 A1      Dec. 12, 2024

(51) Int. Cl.
*G06Q 10/06* (2023.01)
*G06Q 10/0631* (2023.01)

(52) U.S. Cl.
CPC .............................. *G06Q 10/06316* (2013.01)

(58) Field of Classification Search
CPC ...................................................... G06Q 10/06
See application file for complete search history.

(56) References Cited

U.S. PATENT DOCUMENTS

| | | | | |
|---|---|---|---|---|
| 11,194,940 B2 * | 12/2021 | Morgan | .................. | G06F 30/23 |
| 11,561,690 B2 * | 1/2023 | Lekivetz | ............. | G06F 3/04847 |
| 2007/0087756 A1 * | 4/2007 | Hoffberg | .......... | G06Q 10/06375 |
| | | | | 455/450 |
| 2013/0018773 A1 * | 1/2013 | Edvardson | ............. | G06Q 40/06 |
| | | | | 705/37 |
| 2014/0188818 A1 * | 7/2014 | Hirsch | ................ | G06F 16/1748 |
| | | | | 707/692 |
| 2017/0213127 A1 * | 7/2017 | Duncan | .................. | G16B 50/30 |
| 2023/0316545 A1 * | 10/2023 | Liu | ........................ | G06V 20/48 |
| | | | | 382/103 |

FOREIGN PATENT DOCUMENTS

| | | | | |
|---|---|---|---|---|
| CA | 2906651 A1 * | 9/2014 | .......... | G06F 16/245 |

* cited by examiner

*Primary Examiner* — Kurtis Gills
(74) *Attorney, Agent, or Firm* — Greenblum & Bernstein, P.L.C.

(57) ABSTRACT

Methods and systems for performing a combinatorial optimization task are provided. The method includes: receiving a first set of data items and discretizing each of the first set of data items in order to generate a first discretized set of data items; receiving a second set of data items and discretizing each of the second set of data items in order to generate a second discretized set of data items; reorganizing the first and second discretized sets of data items into two respective groups of positive integers; using the two groups of positive integers to generate two respective tables for storing a feasibility of obtaining at least one subset sum from among the elements of the first and second discretized sets of data items; and performing a subset sum matching procedure upon the two tables in order to identify the at least one subset sum.

17 Claims, 10 Drawing Sheets

Subset Sum Matching Problem Solver Device
202

Server Device 204(1)

Database 206(1)

Client Device 208(1)

Communication Network(s)
210

Client Device 208(n)

Server Device 204(n)

Database 206(n)

200

100

102

| Processor 104 Instructions | Memory 106 Instructions | Display 108 | Input Device(s) 110 | Medium Reader 112 Instructions | Network Interface 114 | Output Device(s) 116 |

Bus 118

Network 122

120

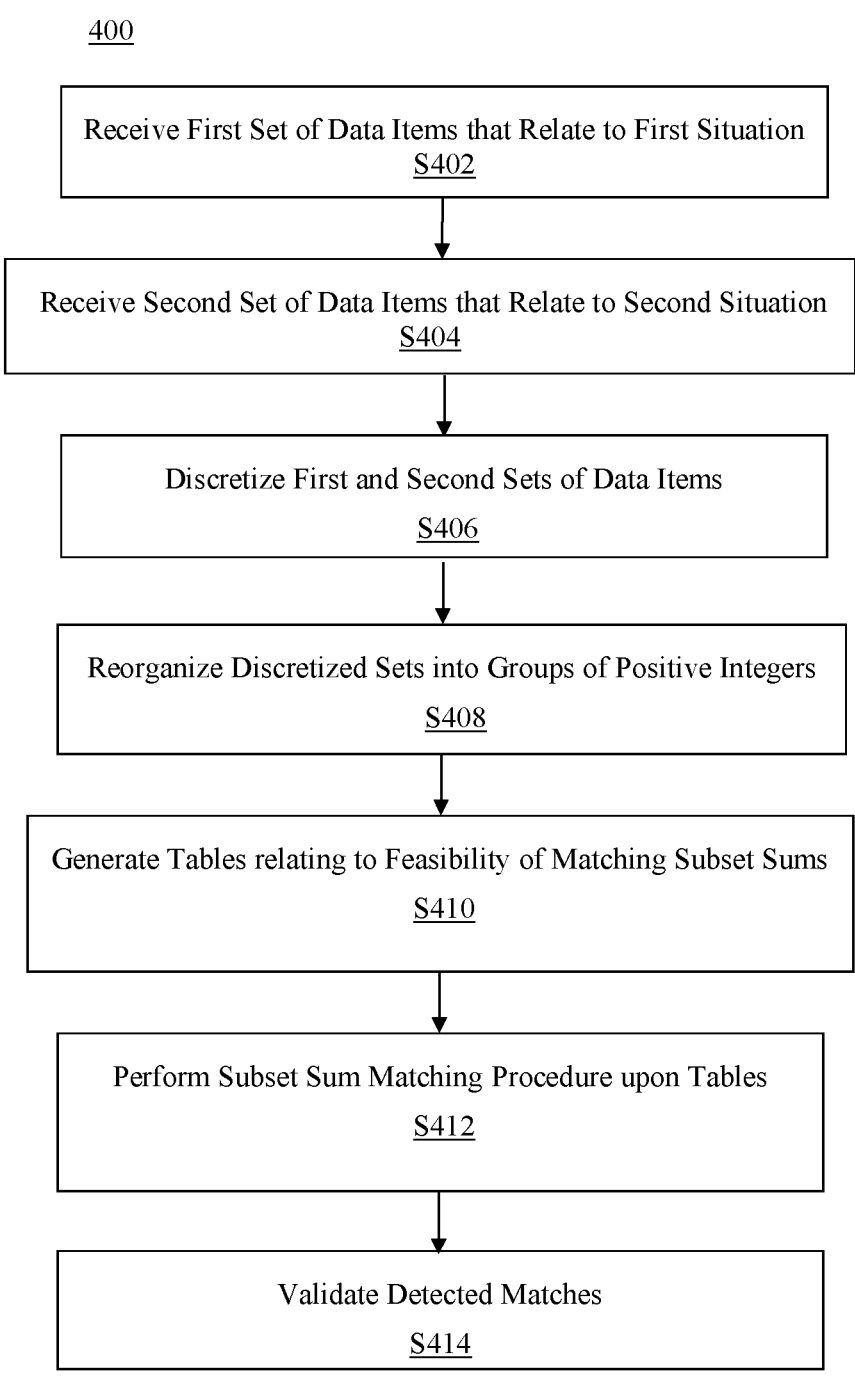

400

Receive First Set of Data Items that Relate to First Situation
S402

Receive Second Set of Data Items that Relate to Second Situation
S404

Discretize First and Second Sets of Data Items
S406

Reorganize Discretized Sets into Groups of Positive Integers
S408

Generate Tables relating to Feasibility of Matching Subset Sums
S410

Perform Subset Sum Matching Procedure upon Tables
S412

Validate Detected Matches
S414

Figure 6:
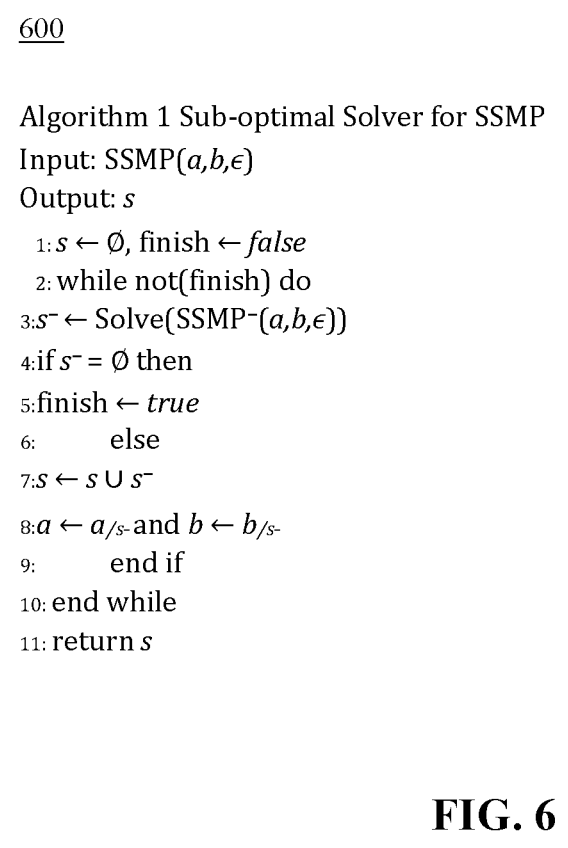

Algorithm 1 Sub-optimal Solver for SSMP

Input: $SSMP(a,b,\epsilon)$

Output: $s$

1: $s \leftarrow \emptyset$, finish $\leftarrow$ *false*

2: while not(finish) do

3: $s^- \leftarrow Solve(SSMP^-(a,b,\epsilon))$

4: if $s^- = \emptyset$ then

5: finish $\leftarrow$ *true*

6:      else

7: $s \leftarrow s \cup s^-$

8: $a \leftarrow a_{/s\text{-}}$ and $b \leftarrow b_{/s\text{-}}$

9:      end if

10: end while

11: return $s$

Algorithm 2 Search Solver for SSMP

Input: SSMP$^-(a,b,\epsilon)$

Output: $s^-$

1: Generate C, D based on $b$

2: for each $w \in \{0,1\}^M \setminus 0$, each $(c,v') \in C$ do

3:Collect target key values K

4:for each $(d,v'')$ with $\kappa \to (d,v'') \in D$, $\kappa \in K$ do

5:if $\langle a_w, b_{v \oplus v'} \rangle$ is a valid *match* then

6:   return $s^- \leftarrow \{\langle a_w, b_{v \oplus v'} \rangle\}$

7:end if

8:     end for

9: end for

10: return $s^- \leftarrow \emptyset$

Figure 9:
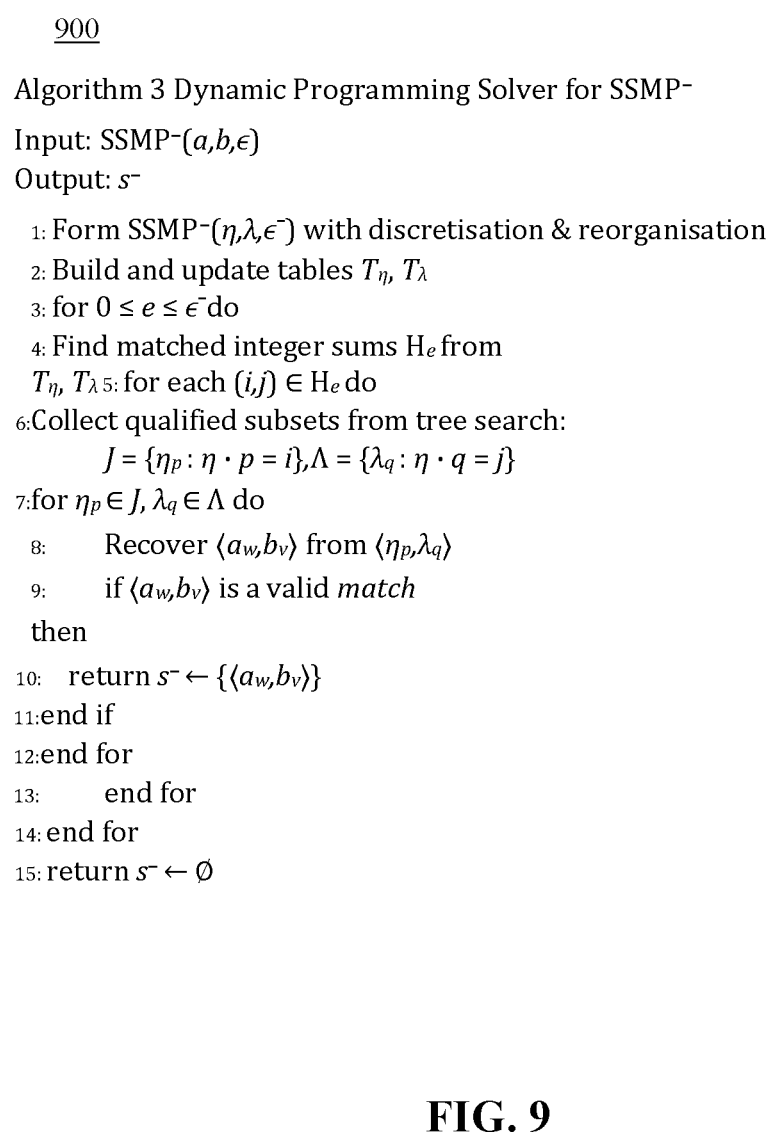

Algorithm 3 Dynamic Programming Solver for SSMP⁻

Input: SSMP⁻$(a,b,\epsilon)$
Output: $s^-$

1: Form SSMP⁻$(\eta,\lambda,\epsilon^-)$ with discretisation & reorganisation
2: Build and update tables $T_\eta$, $T_\lambda$
3: for $0 \le e \le \epsilon^-$ do
4: Find matched integer sums $H_e$ from
$T_\eta$, $T_\lambda$ 5: for each $(i,j) \in H_e$ do
6:Collect qualified subsets from tree search:
$\qquad J = \{\eta_p : \eta \cdot p = i\}, \Lambda = \{\lambda_q : \eta \cdot q = j\}$
7:for $\eta_p \in J$, $\lambda_q \in \Lambda$ do
8:$\qquad$ Recover $\langle a_w,b_v \rangle$ from $\langle \eta_p,\lambda_q \rangle$
9:$\qquad$ if $\langle a_w,b_v \rangle$ is a valid *match*
then
10:$\quad$ return $s^- \leftarrow \{\langle a_w,b_v \rangle\}$
11:end if
12:end for
13:$\qquad$ end for
14: end for
15: return $s^- \leftarrow \emptyset$

METHOD AND SYSTEM FOR SOLVING SUBSET SUM MATCHING PROBLEM USING DYNAMIC PROGRAMMING APPROACH

CROSS-REFERENCE TO RELATED APPLICATIONS

This application is being filed concurrently on Jun. 12, 2023 with U.S. patent application Ser. No. 18/208,603, entitled "Method and System for Solving Subset Sum Matching Problem Using Search Approach"; the contents of which are hereby incorporated by reference in its entirety.

BACKGROUND

1. Field of the Disclosure

This technology generally relates to methods and systems for performing a combinatorial optimization task that relates to finding subsets of matching sums of items that are associated with two parties in an efficient and cost-effective manner.

2. Background Information

Combinatorial Optimization (CO) problems aim to find optimal configuration over a discrete domain of possibilities. Conventional optimization tasks related to subsets, such as, for example, the maximum cut problem, the minimum vertex cover problem, and/or the maximum independent set problem, usually focus on finding an optimal partition of a given set. Some others, such as, for example, the subset sum problem and the knapsack problem, aim to find subsets matching a predetermined target. Matching tasks across two parties like the generalized assignment problem try to find more than one match where each match contains only one element from both sets.

Most of these approaches also include in their definition a given function that checks whether a match is valid. For instance, in the subset sum problem, a match is valid when the sum of the values of the elements on one side is equal to a given target value.

The general CO problem with respect to subsets has many applications in the context of tasks assignment, i.e., matching a set of tasks to a set of workers given some skills constraints. There are also many real-world applications in the financial industry. In particular, it appears intensively in an accounting process known as reconciliation, where two sets of financial records need to be compared to ensure they are numerically accurate and in agreement with each other. Some level of netting differences might be accepted and explained due to when payments and deposits are processed. Reconciliation tasks, e.g. bank, inter-company or customer reconciliations, are labor intensive, and are essential for helping businesses and individuals to confirm that accounts are consistent and complete. They are also fundamental to detect potential fraudulent activities or bank mistakes via discovering discrepancies between two financial records or account balances.

Finding a group of matched items from multiple parties potentially requires exploration of all possible combinations and determining whether a certain combination is a valid match. However, the time cost for this brute-force approach grows exponentially and quickly becomes intractable as the number of items increases.

Accordingly, there is a need for a method for performing a combinatorial optimization task that relates to finding subsets of matching sums of items that are associated with two parties in an efficient and cost-effective manner.

SUMMARY

The present disclosure, through one or more of its various aspects, embodiments, and/or specific features or sub-components, provides, inter alia, various systems, servers, devices, methods, media, programs, and platforms for methods and systems for performing a combinatorial optimization task that relates to finding subsets of matching sums of items that are associated with two parties in an efficient and cost-effective manner.

According to an aspect of the present disclosure, a method for performing a combinatorial optimization task that relates to finding matching subsets among items that are associated with two parties is provided. The method is implemented by at least one processor. The method includes: receiving, by the at least one processor, a first set of data items that relate to respective characteristics of a first situation, and discretizing each of the first set of data items in order to generate a first discretized set of data items; receiving, by the at least one processor, a second set of data items that relate to respective characteristics of a second situation, and discretizing each of the second set of data items in order to generate a second discretized set of data items; reorganizing the first and second discretized sets of data items into two respective groups of positive integers; using the two respective groups of positive integers to generate two respective tables for storing a feasibility of obtaining at least one subset sum match from among the elements of the first and second discretized sets of data items; and performing a subset sum matching procedure upon the two respective tables in order to identify the at least one subset sum match.

The method may further include selecting a value for a matching threshold. The performing of the subset sum matching procedure may include determining whether a difference between a subset sum that corresponds to the second discretized set of data items and a subset sum that corresponds to the first discretized set of data items is less than the selected value for the matching threshold.

The performing of the subset sum matching procedure may further include validating the identified at least one subset sum match.

The reorganizing may include: dividing the first discretized set of data items into a first subset that includes all elements having values greater than zero and a second subset that includes all elements having values less than zero, and generating a third subset that includes absolute values of all elements of the second subset; dividing the second discretized set of data items into a fourth subset that includes all elements having values greater than zero and a fifth subset that includes all elements having values less than zero, and generating a sixth subset that includes absolute values of all elements of the fifth subset; performing a first vector concatenation operation between the first subset and the sixth subset in order to generate a first one of the two respective groups of positive integers; and performing a second vector concatenation operation between the third subset and the fourth subset in order to generate a second one of the two respective groups of positive integers.

For each of the two respective tables, a number of columns may be equal to a largest subset value that is matchable between the two respective groups of positive integers plus one. For a first one of the two respective tables, a number of rows may be equal to a number of elements included in a first one of the two respective groups of positive integers. For a second one of the two respective tables, a number of rows may be equal to a number of elements included in a second one of the two respective groups of positive integers.

The performing of the subset sum matching procedure may include comparing a last row of the first one of the two respective tables with a last row of of the second one of the two respective tables in order to identify at least one ordered pair of values that corresponds to a matching pair of subset sums from among the first and second discretized sets of data items.

The performing of the subset sum matching procedure may further include using the at least one ordered pair to apply a binary tree search to each of the two respective tables in order to determine the matching pair of subset sums.

The first situation may relate to a first set of records that is associated with a first party from among the two parties. The second situation may relate to a second set of records that is associated with a second party from among the two parties.

According to another exemplary embodiment, a computing apparatus for performing a combinatorial optimization task that relates to finding matching subsets among items that are associated with two parties is provided. The computing apparatus includes a processor; a memory; and a communication interface coupled to each of the processor and the memory. The processor is configured to: receive, via the communication interface, a first set of data items that relate to respective characteristics of a first situation, and discretize each of the first set of data items in order to generate a first discretized set of data items; receive, via the communication interface, a second set of data items that relate to respective characteristics of a second situation, and discretize each of the second set of data items in order to generate a second discretized set of data items; reorganize the first and second discretized sets of data items into two respective groups of positive integers; use the two respective groups of positive integers to generate two respective tables for storing a feasibility of obtaining at least one subset sum match from among the elements of the first and second discretized sets of data items; and perform a subset sum matching procedure upon the two respective tables in order to identify the at least one subset sum match.

The processor may be further configured to: select a value for a matching threshold; and determine, as a part of the subset sum matching procedure, whether a difference between a subset sum that corresponds to the second discretized set of data items and a subset sum that corresponds to the first discretized set of data items is less than the selected value for the matching threshold.

The processor may be further configured to validate the identified at least one subset sum match.

The processor may be further configured to reorganize the first and second discretized sets of data items by: dividing the first discretized set of data items into a first subset that includes all elements having values greater than zero and a second subset that includes all elements having values less than zero, and generating a third subset that includes absolute values of all elements of the second subset; dividing the second discretized set of data items into a fourth subset that includes all elements having values greater than zero and a fifth subset that includes all elements having values less than zero, and generating a sixth subset that includes absolute values of all elements of the fifth subset; performing a first vector concatenation operation between the first subset and the sixth subset in order to generate a first one of the two respective groups of positive integers; and performing a second vector concatenation operation between the third subset and the fourth subset in order to generate a second one of the two respective groups of positive integers.

For each of the two respective tables, a number of columns may be equal to a largest subset value that is matchable between the two respective groups of positive integers plus one. For a first one of the two respective tables, a number of rows may be equal to a number of elements included in a first one of the two respective groups of positive integers. For a second one of the two respective tables, a number of rows may be equal to a number of elements included in a second one of the two respective groups of positive integers.

As a part of the subset sum matching procedure, the processor may be further configured to compare a last row of the first one of the two respective tables with a last row of the second one of the two respective tables in order to identify at least one ordered pair of values that corresponds to a matching pair of subset sums from among the first and second discretized sets of data items.

The processor may be further configured to use the at least one ordered pair to apply a binary tree search to each of the two respective tables in order to determine the matching pair of subset sums.

The first situation may relate to a first set of records that is associated with a first party from among the two parties. The second situation may relate to a second set of records that is associated with a second party from among the two parties.

According to yet another exemplary embodiment, a non-transitory computer readable storage medium storing instructions for performing a combinatorial optimization task that relates to finding matching subsets among items that are associated with two parties is provided. The storage medium includes executable code which, when executed by a processor, causes the processor to: receive a first set of data items that relate to respective characteristics of a first situation, and discretize each of the first set of data items in order to generate a first discretized set of data items; receive a second set of data items that relate to respective characteristics of a second situation, and discretize each of the second set of data items in order to generate a second discretized set of data items; reorganize the first and second discretized sets of data items into two respective groups of positive integers; use the two respective groups of positive integers to generate two respective tables for storing a feasibility of obtaining at least one subset sum match from among the elements of the first and second discretized sets of data items; and perform a subset sum matching procedure upon the two respective tables in order to identify the at least one subset sum match.

When executed by the processor, the executable code may further cause the processor to select a value for a matching threshold, and to determine, as a part of the subset sum matching procedure, whether a difference between a subset sum that corresponds to the second discretized set of data items and a subset sum that corresponds to the first discretized set of data items is less than the selected value for the matching threshold.

When executed by the processor, the executable code may further cause the processor to validate the identified at least one subset sum match.

When executed by the processor, the executable code may further cause the processor to reorganize the first and second discretized sets of data items by: dividing the first discretized set of data items into a first subset that includes all elements having values greater than zero and a second subset that includes all elements having values less than zero, and generating a third subset that includes absolute values of all elements of the second subset; dividing the second discretized set of data items into a fourth subset that includes all elements having values greater than zero and a fifth subset that includes all elements having values less than zero, and generating a sixth subset that includes absolute values of all elements of the fifth subset; performing first vector concatenation operation between the first subset and the sixth subset in order to generate a first one of the two respective groups of positive integers; and performing a second vector concatenation operation between the third subset and the fourth subset in order to generate a second one of the two respective groups of positive integers.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 4 is a flowchart of an exemplary process for implementing a method for performing a combinatorial optimization task that relates to finding subsets of matching sums of items that are associated with two parties in an efficient and cost-effective manner.

FIG. 6 is a first algorithm that is usable for implementing a method for performing a combinatorial optimization task that relates to finding subsets of matching sums of items that are associated with two parties in an efficient and cost-effective manner, according to an exemplary embodiment.

FIG. 7 is a second algorithm that is usable for implementing a method for performing a combinatorial optimization task that relates to finding subsets of matching sums of items that are associated with two parties in an efficient and cost-effective manner, according to an exemplary embodiment.

FIG. 9 is a third algorithm that is usable for implementing a method for performing a combinatorial optimization task that relates to finding subsets of matching sums of items that are associated with two parties in an efficient and cost-effective manner, according to an exemplary embodiment.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
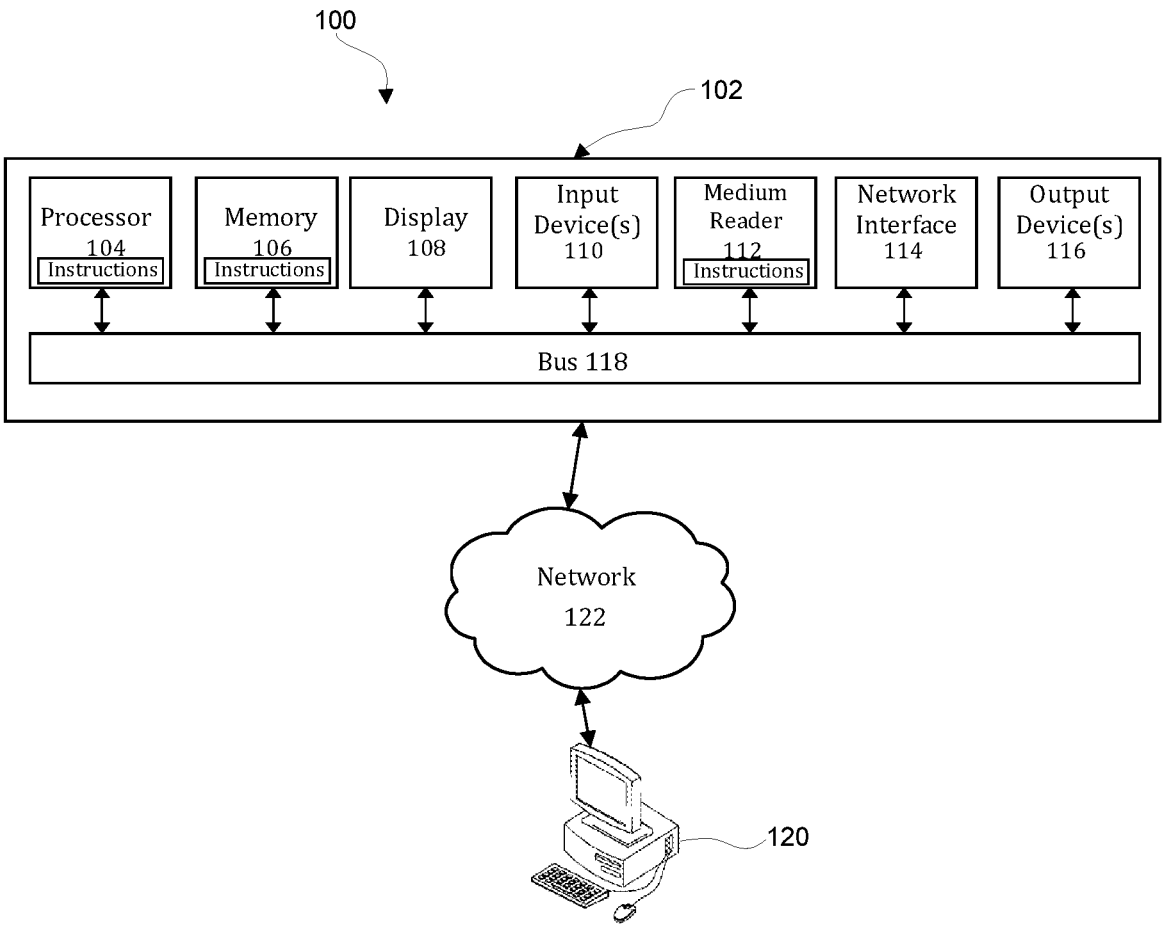
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field program-mable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communica-tion. Memories described herein are tangible storage medi-ums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray® disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alter-native, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hard-ware, software or any combination thereof which are com-monly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the compo-nents may each be interconnected and communicate via an internal bus. However, those skilled in the art appreciate that any of the components may also be connected via an expansion bus. Moreover, the bus 118 may enable commu-nication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network com-monly known and understood in the art. The short-range network may include, for example, Bluetooth®, Zigbee®, infrared, near field communication, ultraband, or any com-bination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a commu-nications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without depart-ing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for performing a combinatorial optimization task that relates to finding subsets of matching sums of items that are associated with two parties in an efficient and cost-effective manner.

Figure 2:
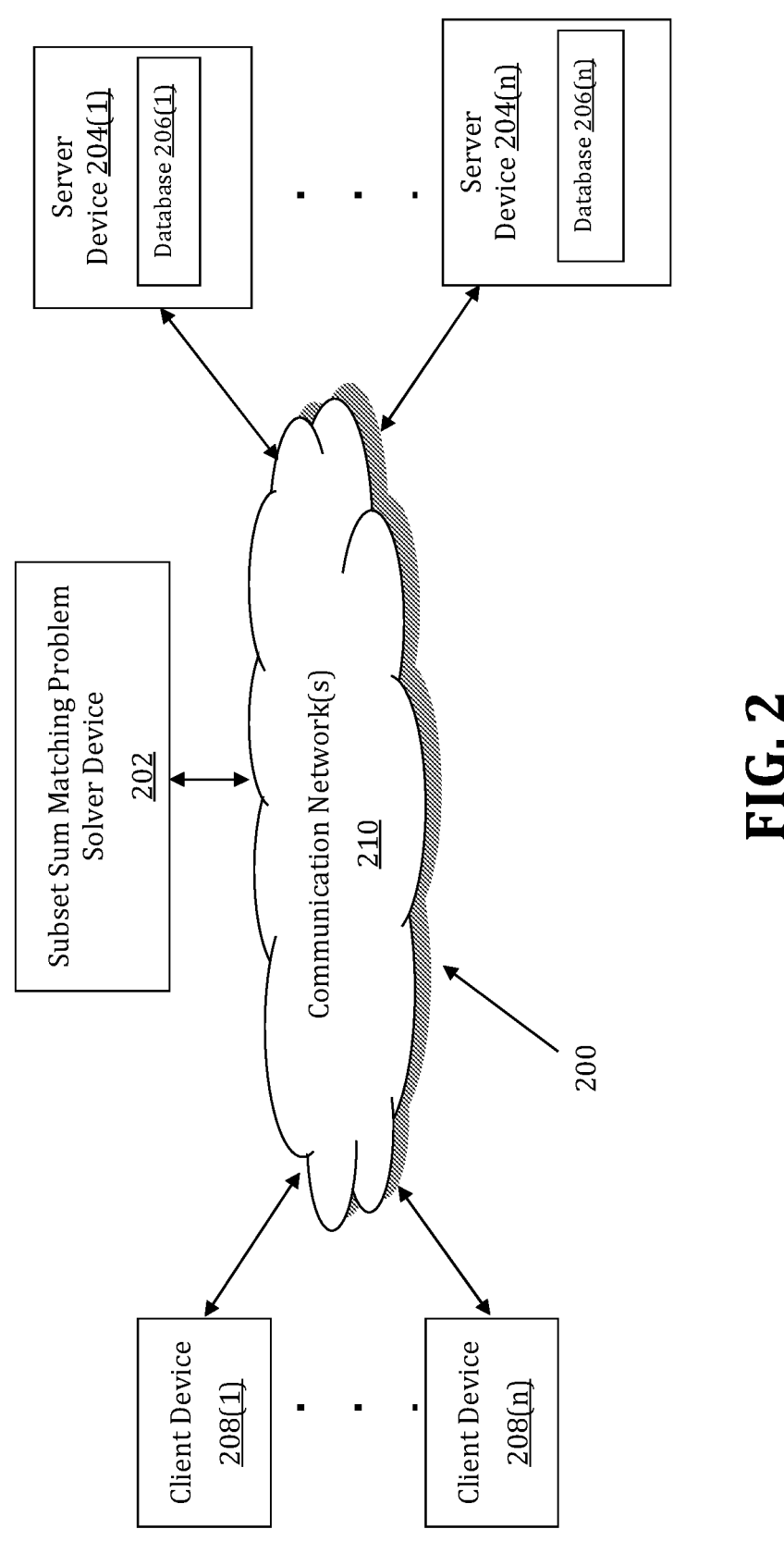
FIG. 2 illustrates an exemplary diagram of a network environment.

Referring to FIG. 2, a schematic of an exemplary network environment 200 for implementing a method for performing a combinatorial optimization task that relates to finding subsets of matching sums of items that are associated with two parties in an efficient and cost-effective manner is illustrated. In an exemplary embodiment, the method is executable on any networked computer platform, such as, for example, a personal computer (PC).

The method for performing a combinatorial optimization task that relates to finding subsets of matching sums of items that are associated with two parties in an efficient and cost-effective manner may be implemented by a Subset Sum Matching Problem Solver (SSMPS) device 202. The SSMPS device 202 may be the same or similar to the computer system 102 as described with respect to FIG. 1. The SSMPS device 202 may store one or more applications that can include executable instructions that, when executed by the SSMPS device 202, cause the SSMPS device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SSMPS device 202 itself, may be located in virtual server(s) running in a cloud-based computing environment rather than being tied to one or more specific physical network computing devices. Also, the application(s) may be running in one or more virtual machines (VMs) executing on the SSMPS device 202. Additionally, in one or more embodiments of this technology, virtual machine(s) running on the SSMPS device 202 may be managed or supervised by a hypervisor.

In the network environment 200 of FIG. 2, the SSMPS device 202 is coupled to a plurality of server devices 204(1)-204(n) that hosts a plurality of databases 206(1)-206(n), and also to a plurality of client devices 208(1)-208(n) via communication network(s) 210. A communication interface of the SSMPS device 202, such as the network interface 114 of the computer system 102 of FIG. 1, operatively couples and communicates between the SSMPS device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SSMPS device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and SSMPS devices that efficiently implement a method for performing a combinatorial optimization task that relates to finding subsets of matching sums of items that are associated with two parties in an efficient and cost-effective manner.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SSMPS device 202 may be a standalone device or integrated with one or more other devices or apparatuses, such as one or more of the server devices 204(1)-204(n), for example. In one particular example, the SSMPS device 202 may include or be hosted by one of the server devices 204(1)-204(n), and other arrangements are also possible. Moreover, one or more of the devices of the SSMPS device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SSMPS device 202 via the communication network(s) 210 according to the HTTP-based and/or JavaScript® Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store information that relates to algorithm-specific parameters and information that relates to metrics for performance and efficiency of the algorithms in solving a problem that relates to finding subsets of matching sums of items that are associated with two parties.

Although the server devices 204(1)-204(n) are illustrated as single devices, one or more actions of each of the server devices 204(1)-204($n$) may be distributed across one or more distinct network computing devices that together comprise one or more of the server devices 204(1)-204($n$). Moreover, the server devices 204(1)-204($n$) are not limited to a particular configuration. Thus, the server devices 204(1)-204($n$) may contain a plurality of network computing devices that operate using a master/slave approach, whereby one of the network computing devices of the server devices 204(1)-204($n$) operates to manage and/or otherwise coordinate operations of the other network computing devices.

The server devices 204(1)-204($n$) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208($n$) may also be the same or similar to the computer system 102 or the computer device 120 as described with respect to FIG. 1, including any features or combination of features described with respect thereto. For example, the client devices 208(1)-208($n$) in this example may include any type of computing device that can interact with the SSMPS device 202 via communication network(s) 210. Accordingly, the client devices 208(1)-208($n$) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208($n$) may run interface applications, such as standard web browsers or standalone client applications, which may provide an interface to communicate with the SSMPS device 202 via the communication network(s) 210 in order to communicate user requests and information. The client devices 208(1)-208($n$) may further include, among other features, a display device, such as a display screen or touchscreen, and/or an input device, such as a keyboard, for example.

Although the exemplary network environment 200 with the SSMPS device 202, the server devices 204(1)-204($n$), the client devices 208(1)-208($n$), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SSMPS device 202, the server devices 204(1)-204($n$), or the client devices 208(1)-208($n$), for example, may be configured to operate as virtual instances on the same physical machine. In other words, one or more of the SSMPS device 202, the server devices 204(1)-204($n$), or the client devices 208(1)-208($n$) may operate on the same physical device rather than as separate devices communicating through communication network(s) 210. Additionally, there may be more or fewer SSMPS devices 202, server devices 204(1)-204($n$), or client devices 208(1)-208($n$) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
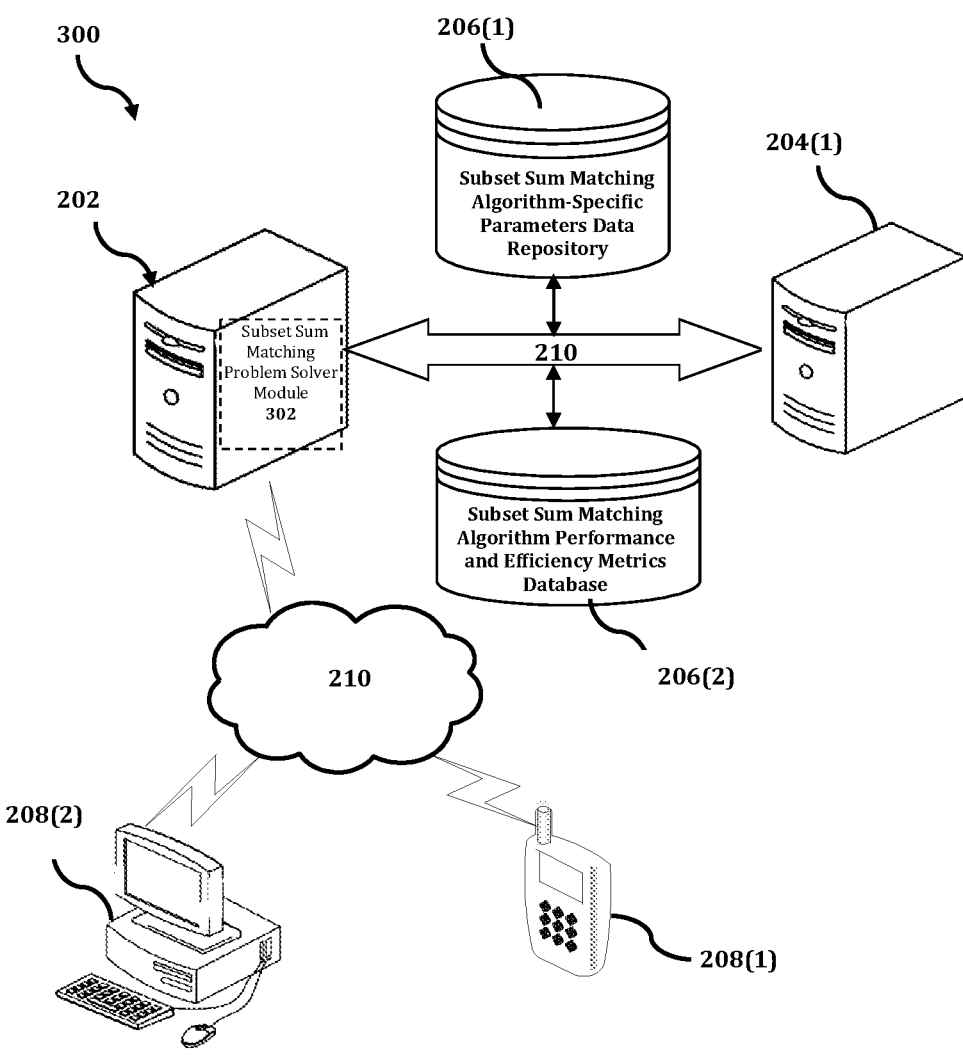
FIG. 3 shows an exemplary system for implementing a method for performing a combinatorial optimization task that relates to finding subsets of matching sums of items that are associated with two parties in an efficient and cost-effective manner.

The SSMPS device 202 is described and illustrated in FIG. 3 as including a subset sum matching problem solver module 302, although it may include other rules, policies, modules, databases, or applications, for example. As will be described below, the subset sum matching problem solver module 302 is configured to implement a method for performing a combinatorial optimization task that relates to finding subsets of matching sums of items that are associated with two parties in an efficient and cost-effective manner.

An exemplary process 300 for implementing a mechanism for performing a combinatorial optimization task that relates to finding subsets of matching sums of items that are associated with two parties in an efficient and cost-effective manner by utilizing the network environment of FIG. 2 is illustrated as being executed in FIG. 3. Specifically, a first client device 208(1) and a second client device 208(2) are illustrated as being in communication with SSMPS device 202. In this regard, the first client device 208(1) and the second client device 208(2) may be "clients" of the SSMPS device 202 and are described herein as such. Nevertheless, it is to be known and understood that the first client device 208(1) and/or the second client device 208(2) need not necessarily be "clients" of the SSMPS device 202, or any entity described in association therewith herein. Any additional or alternative relationship may exist between either or both of the first client device 208(1) and the second client device 208(2) and the SSMPS device 202, or no relationship may exist.

Further, SSMPS device 202 is illustrated as being able to access a subset sum matching algorithm-specific parameters data repository 206(1) and a subset sum matching algorithm performance and efficiency metrics database 206(2). The subset sum matching problem solver module 302 may be configured to access these databases for implementing a method for performing a combinatorial optimization task that relates to finding subsets of matching sums of items that are associated with two parties in an efficient and cost-effective manner.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the SSMPS device 202 via broadband or cellular communication. Of course, these embodiments are merely exemplary and are not limiting or exhaustive.

Upon being started, the subset sum matching problem solver module 302 executes a process for performing a combinatorial optimization task that relates to finding subsets of matching sums of items that are associated with two parties in an efficient and cost-effective manner. An exemplary process for performing a combinatorial optimization task that relates to finding subsets of matching sums of items that are associated with two parties in an efficient and cost-effective manner is generally indicated at flowchart 400 in FIG. 4.

In process 400 of FIG. 4, at step S402, the subset sum matching problem solver module 302 receives a first set of data items that relate to respective characteristics of a first situation; and at step S404, the subset sum matching problem solver module 302 receives a second set of data items that relate to respective characteristics of a second situation. In an exemplary embodiment, the data items in both sets correspond to numerical values. Each particular situation may relate to a respective set of records, such as, for example, financial records, that are associated with a particular party, such as an individual or a business entity.

At step S406, the subset sum matching problem solver module 302 discretizes each of the first and second sets of data items in order to generate a first discretized set of data items and a second discretized set of data items. Then, at step S408, the subset sum matching problem solver module 302 reorganizes the two discretized sets of data items into two groups of positive integers.

In an exemplary embodiment, the reorganizing operation may be performed as follows: First, the first discretized set of data items is divided into a first subset that includes all elements having values greater than or equal to zero and a second subset that includes all elements having values less than zero, and then a third subset is generated that includes absolute values of all elements of the second subset (i.e., the negative signs are reversed to be positive signs). Second, the second discretized set of data items is divided into a fourth subset that includes all elements having values greater than or equal to zero and a fifth subset that includes all elements having values less than zero, and then a sixth subset is generated that includes absolute values of all elements of the fifth subset (i.e., the negative signs are again reversed to be positive signs). Third, a first vector concatenation operation is performed between the first subset and the sixth subset in order to generate a first group of positive integers; and fourth, a second vector concatenation operation is performed between the third subset and the fourth subset in order to generate a second group of positive integers.

At step S410, the subset sum matching problem solver module 302 uses the two groups of positive integers to generate respective tables for storing a feasibility of obtaining subset sum matches from the elements of the first and second discretized sets of data items. In an exemplary embodiment, for each of the two tables, the number of columns may be equal to a largest subset value that is matchable between the two groups of positive integers plus one. In addition, for a first one of the two tables, the number of rows may be equal to a number of elements included in a first one of the two groups of positive integers; and for a second one of the two tables, a number of rows may be equal to the number of elements included in a second one of the two groups of positive integers.

At step S412, the subset sum matching problem solver module 302 performs a subset sum matching procedure upon the two tables generated in step S410 in order to identify subset sum matches. In an exemplary embodiment, the subset sum matching procedure may include an operation of comparing the last row of the first one of the two tables generated in step S410 with the last row of the second of the two tables in order to identify ordered pairs of values that correspond to matching pairs of subset sums from among the first and second discretized sets of data items. In addition, the subset sum matching procedure may further include using the ordered pairs of values to apply a binary search tree to each of the two tables in order to determine the matching pairs of subset sums.

In an exemplary embodiment, the determination of whether a there is a match between subset sums may not require an exact match; instead, a matching threshold may be selected, and then when a difference between a particular pair of subset sums is less than or equal to the matching threshold, then the particular pair of subset sums may be deemed as being a match.

Finally, at step S414, the subset sum matching problem solver module 302 validates the matched pairs of subset sums identified in step S412, in order to ensure that the identified matches are correctly identified as such.

Combinatorial Optimization (CO) problems aim to find an optimal configuration over a discrete domain of possibilities. In an exemplary embodiment, the present disclosure proposes and formulates a new type of combinatorial optimization problem, which targets on finding an optimal group of matched subsets from two parties. This problem is referred to herein as the Subset Matching Problem (SMP). Previous optimization tasks related to subsets, e.g., the maximum cut problem, the minimum vertex cover problem, and/or the maximum independent set problem, usually focusing on finding an optimal partition of a given set. Some others, e.g. the subset sum problem and the knapsack problem, aim to find subsets matching a predetermined target. Matching tasks across two parties like the generalized assignment problem, try to find more than one match where each match contains only one element from both sets. Most of these approaches also include in their definition a given function that checks whether a match is valid. For instance, in the subset sum problem, a match is valid when the sum of the values of the elements on one side is equal to a given target value. Instead, SMIP tries to find a set of multiple subset pairs, without any constraint in the size of the subsets. Also, SMIP is independent of the function used to define the validity of a given match. This function is an input to the task. Finally, as opposed to other tasks computing several matches, SMIP allows some elements to not be part of a match in the solution.

Figure 5:
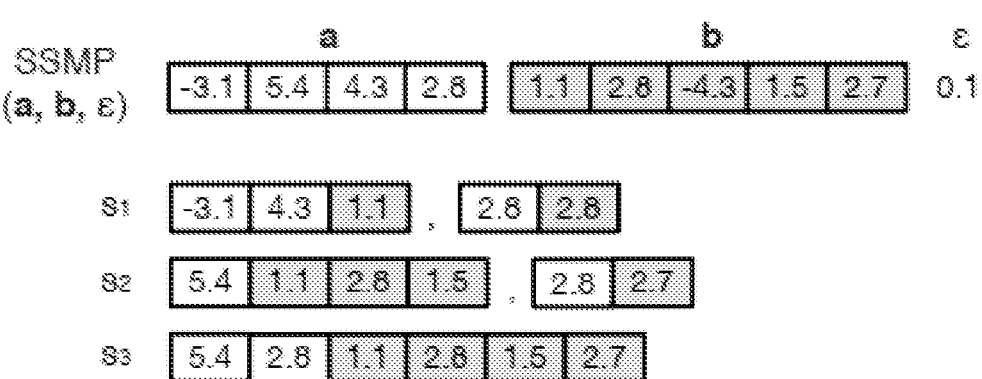
FIG. 5 is an example of a specific type of subset sum matching problem and a variety of valid solutions, according to an exemplary embodiment.

Based on the formulation of SMP, the Subset Sum Matching Problem (SSMP) is introduced. The SSMP is a specific type of SMIP where the validation function focuses on subset sums. FIG. 5 is an example 500 of this type of subset sum matching problem and a variety of valid solutions, according to an exemplary embodiment. There are several characteristics of SSMP: 1) it looks for sets of subset pairs; 2) subsets are drawn from two parties and form a matched pair, while other problems normally have only one party (e.g. one set or graph) or one of the parties only contains one element; 3) each element can either appear in one subset or remain unselected; 4) elements contained in each party are real values, either positive or negative; and 5) the matching criteria requires that the numerical difference is within a tolerance instead of restricting to perfect matching.

While the general SMIP problem have many applications in the context of tasks assignment, i.e., matching a set of tasks to a set of workers given some skills constraints, the present disclosure focuses on formulating and solving the SSMP case. SSMP has many real-world applications in the financial industry. In particular, it appears intensively in an accounting process known as reconciliation, where two sets of records, e.g., financial records, need to be compared to ensure they are numerically accurate and in agreement with each other. Some level of netting differences might be accepted and explained due to when payments and deposits are processed. Reconciliation tasks, e.g. bank, inter-company or customer reconciliations, are labor-intensive, and are essential for helping businesses and individuals to confirm that accounts are consistent and complete. They are also fundamental to detect potential fraudulent activities or bank mistakes via discovering discrepancies between two financial records or account balances.

Subset Matching Problem—Problem Definition: Assume $a \in A^M$, $b \in B^N$ are two ordered lists of items. Subsets of a and b are represented with $a_w$ and $b_v$, where $w \in \{0,1\}^M$, $v \in \{0,1\}^N$ are inclusion vectors indicating inclusion/exclusion of each element in that subset corresponding to ordered lists a, b. Let $f: A^M \times B^N \to \{\text{True, False}\}$ be a function that decides whether a pair of subsets forms a valid match. Hence, a (valid) match is a pair of subsets $(a_v, b_v)$ that satisfies $f(a_v, b_v) = \text{True}$.

The Subset Matching Problem (SMP) aims to find a set of matches with nonoverlapping elements that maximize some metric. Let S be the finite set of feasible solutions to an SMP, each feasible solution $s \in S$ can be expressed as combination of $K \geq 0$ matches ($s = \emptyset$ if $K=0$):

$$s = \left\{ \left\langle a_{w^k}, b_{v^k} \right\rangle \right\}_{k=1,\ldots,K}$$

where inclusion vectors in all matches do not overlap:

$$\forall\, i, j \in [1, K],\, i \neq j,\, w^i \cdot w^j = 0,\, v^i \cdot v^j = 0 \qquad \text{(Expression 1)}$$

A SMP is defined as a combinatorial optimization problem SMP($a,b,f,\Psi$), where $\Psi: S \to \mathbb{R}$ is a measure of the solution quality to be maximized. An optimal solution is:

$$s^* = \arg\max_{s \in S} \Psi(s) \qquad \text{(Expression 2)}$$

The complexity of SMP problems is Bell(M+N) where Bell($\cdot$) indicates bell numbers.

Corresponding Decision Problem: A definition of SMP⁻($a,b,f$) is given as the decision problem corresponding to the SMP CO problem that checks for the existence of a non-empty solution. The SMP⁻ can be answered with 1) 'yes', by finding (any) one match or 2) 'no', by proving that an empty solution with K=0 is the only feasible solution. The finite set of feasible solutions of the corresponding SMP⁻, marked as S⁻, is a subset of the corresponding S:

$$S^- = \left\{ s^- \in S : |s^-| \leq 1 \right\} \qquad \text{(Expression 3)}$$

where $|s|$ is the cardinality of a set. An SMIP is unmatchable if the answer to its corresponding decision problem is 'no' or, equivalently, the only valid solution that can be can found in S⁻ is $s^- = \emptyset (S^- \{\emptyset\})$.

The Subset Sum Matching Problem: The Subset Sum Matching Problem (SSMP) is a subtype of SMP, which formalizes a group of real-world problems like reconciliation in the financial domain. In an exemplary embodiment, a formulation of SSMP that derives from the above-described definition of SMIP is provided. In particular, the matching function $f$ is defined as checking whether the differences between the sums of the numbers of each match on the two sides is below a given threshold, given by a parameter E.

$$f_{SSMP}(a_w, b_v, \epsilon) = (|w \cdot a - v \cdot b| \leq \epsilon) \wedge (w, v \neq 0) \qquad \text{(Expression 4)}$$

where $\cdot$ is the dot scalar product and 0 represents all-zero vectors. Different measures can be defined to be optimized. In the present disclosure, T is defined as:

$$\Psi_{SSMP}(s) = \sum_{k=1}^{K} \left[ \sum_{m=1}^{M} w_m^k + \sum_{n=1}^{N} v_n^k \right] + K \qquad \text{(Expression 5)}$$

to encourage solutions to cover more elements with finer-grained matches. Considering Expressions (4) and (5), the following definition is provided:

$$\text{SSMP}(a,b,\epsilon) = SMP(a,b,f_{SSMP},\Psi_{SSMP})$$

Likewise, the corresponding decision problem of SSMP is written as SSMP⁻($a,b,\epsilon$) which is an NP-complete problem, and the combinatorial optimization problem S SMIP is an NP-optimization problem (NPO).

FIG. 6 is a first algorithm 600 that is usable for implementing a method for performing a combinatorial optimization task that relates to finding subsets of matching sums of items that are associated with two parties in an efficient and cost-effective manner, according to an exemplary embodiment.

Sub-optimal Solutions of SSMPs: A sub-optimal solution of SSMP can be computed by a greedy algorithm that iteratively creates and solves a series of SSMP⁻ tasks with the remaining elements in a and b. As shown in algorithm 600, the union of all SSMP⁻ solutions, found until the formed SSMP⁻ returns an empty set, is a local-optimal solution of the original SSMP.

In the following section, the present disclosure describes two algorithms towards the local-optimal solutions for solving SSMP⁻ based on search and dynamic programming. Both algorithms aim to greedily find a valid solution of SSMP⁻ which either contains a valid match or it is an empty set. The validation of a potential match $(a_v, b_v)$ is addressed in a post-hoc manner by simply checking whether it obeys Expression 4. If the solution is not valid, the algorithm will continue to find the next solution until one valid solution is discovered or no non-empty solutions can be found.

Figure 8:
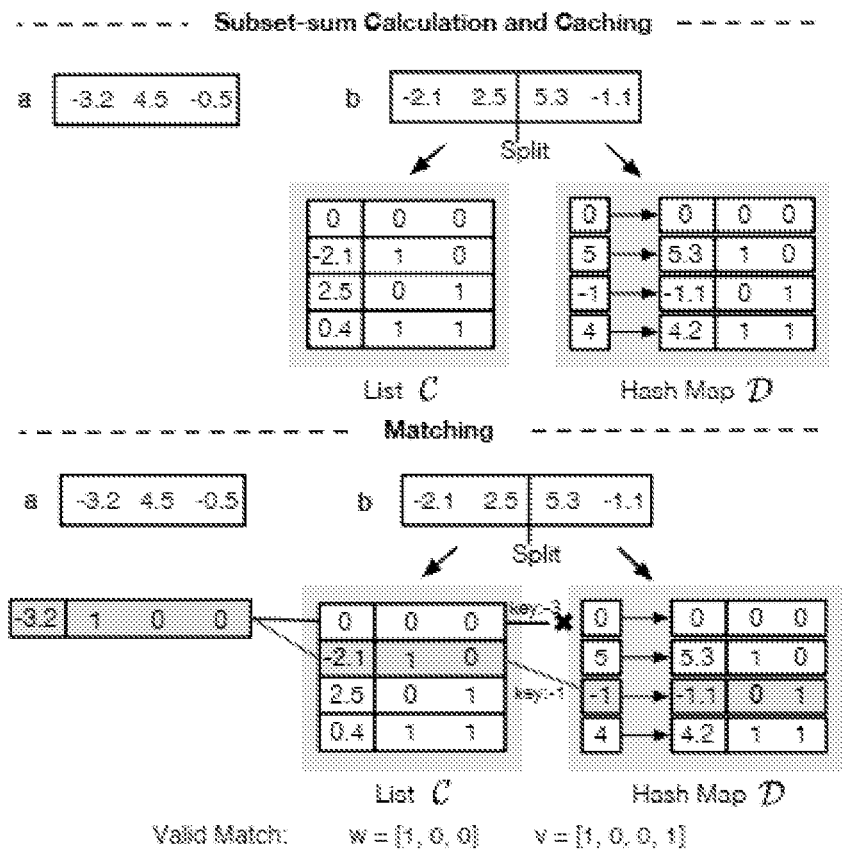
FIG. 8 is an example of how to apply the second algorithm for solving a problem that relates to finding subsets of matching sums of items that are associated with two parties in an efficient and cost-effective manner, according to an exemplary embodiment.

FIG. 7 is a second algorithm 700 that is usable for implementing a method for performing a combinatorial optimization task that relates to finding subsets of matching sums of items that are associated with two parties in an efficient and cost-effective manner, according to an exemplary embodiment. FIG. 8 is an example 800 of how to apply the second algorithm for solving a problem that relates to finding subsets of matching sums of items that are associated with two parties in an efficient and cost-effective manner, according to an exemplary embodiment.

Search Solver for SSMP⁻: The search solver applies an exhaustive search due to lack of heuristics for SSMPs. Caching is employed in order to reduce the run-time. The SSMP⁻ search solver contains two steps: 1) pre-computing subset sums and storing them in memory; and 2) search in memory until a valid match is found. The search solver is shown in algorithm 700, and FIG. 8 is an illustration 800 of the algorithm with an example.

Pre-calculation and Caching: Pre-calculation and caching can avoid repetitively computing the same combinations during the search procedure. Assume N M. A split is applied to the longer vector b into two parts b', b" satisfying:

$$b' \oplus b'' = b, |b'| = r \qquad \text{(Expression 11)}$$

where $\oplus$ is the vector concatenation and $r \in [0,N]$ is the split point. The corresponding inclusion-exclusion vectors for subsets representing b', and b" are $v' \in \{0,1\}^r$ and $v'' \in \{0, 1\}^{N-r}$, without excluding all-zero vectors. Subset sum calculation and caching for these two components are performed in slightly different ways.

First, for all possible $v' \in \{0,1\}^r$, the corresponding subset sum c is calculated and stored in a list C ($|C|=2^r$):

$$C = \{(c, v'):c = v' \cdot b', v' \in \{0, 1\}^r\} \qquad \text{(Expression 12)}$$

Second, for all possible $v'' \in \{0,1\}^{N-r}$, a calculation of subset sum d is performed, and the result is stored in a hashmap D with a hash function $h(\cdot)$ ($|D|=2^{N-r}$):

$$D = \{h(d) \rightarrow (d, v''):d = v'' \cdot b'', v'' \in \{0, 1\}^{N-r}\} \qquad \text{(Expression 13)}$$

Matching: The matching procedure in the search-based approach is described in algorithm 700, which goes through all subsets sums of a and searches for matched values from the subset sums of b. With the help of the pre-calculated subset sums stored, the algorithm iterates each $w \in \{0,1\}^M \backslash 0$ for calculating subset sums of a in run-time while recalling each record (c,v') stored in list C. The search targets (d,v") $\in$ D that can form a match that satisfies (see Expression (4)):

$$d \in [w \cdot a - c - \epsilon, w \cdot a - c + \epsilon] \qquad \text{(Expression 14)}$$

Assume the hash function $h(\cdot)$ is non-decreasing. Any target d satisfying Expression (14), if it exists, must be linked to a corresponding set of keys:

$$K = \{\kappa:\kappa \in [h(w \cdot a - c - \epsilon), h(w \cdot a - c + \epsilon)]\} \qquad \text{(Expression 15)}$$

The algorithm searches the hash-map for these keys and collects a set of elements:

$$\{(d, v''):\kappa \rightarrow (d, v'') \in D, \kappa \in K\} \qquad \text{(Expression 16)}$$

Each (d,v"), with given w and (c,v'), leads to a potential match $\langle a_w, b_v \rangle$, $v=v' \oplus v''$ to be validated. Any validated match will be returned as the solution for SSMP⁻. Otherwise, the algorithm will keep searching.

Figure 10:
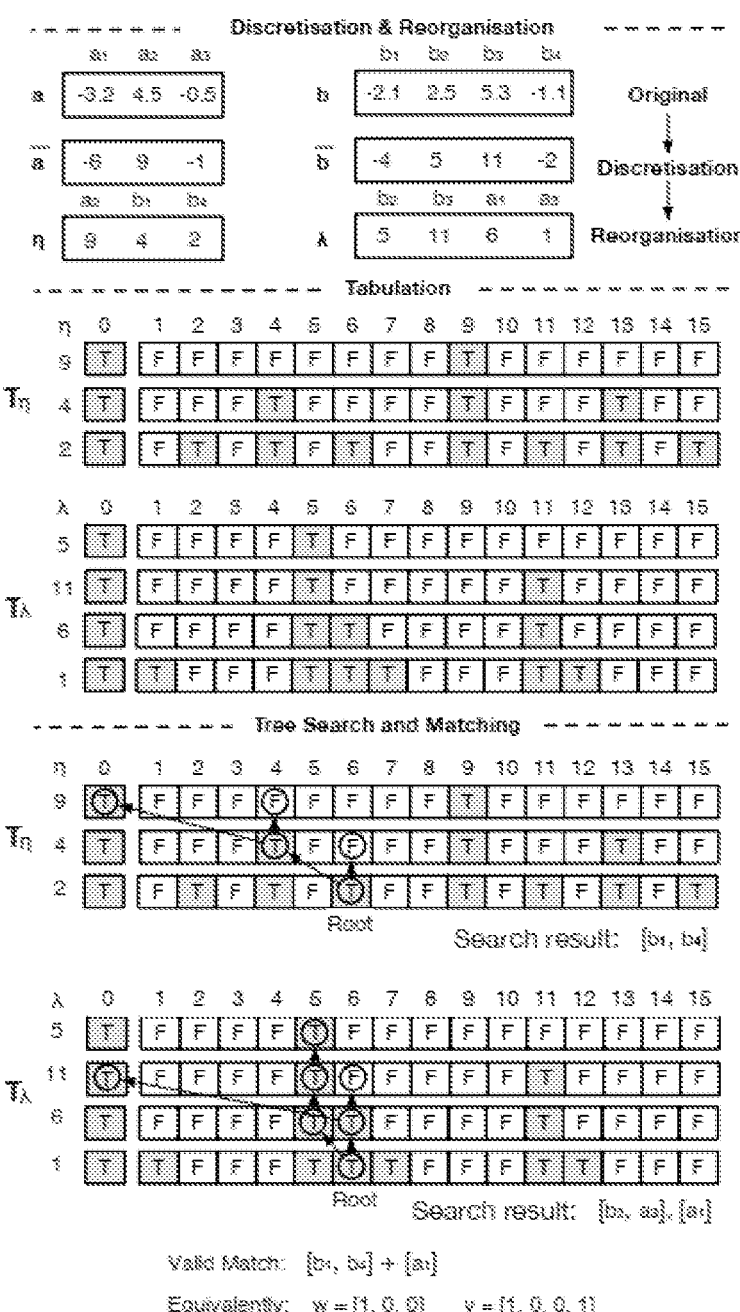
FIG. 10 is an example of how to apply the third algorithm for solving a problem that relates to finding subsets of matching sums of items that are associated with two parties in an efficient and cost-effective manner, according to an exemplary embodiment.

FIG. 9 is a third algorithm 900 that is usable for implementing a method for performing a combinatorial optimization task that relates to finding subsets of matching sums of items that are associated with two parties in an efficient and cost-effective manner, according to an exemplary embodiment. FIG. 10 is an example 1000 of how to apply the third algorithm for solving a problem that relates to finding subsets of matching sums of items that are associated with two parties in an efficient and cost-effective manner, according to an exemplary embodiment.

Dynamic Programming Solver for SSMP⁻: Dynamic programming (DP) for SSMP⁻ is a pseudo-polynomial solver. Like the search-based approach, this DP solver is also a method for finding potential matches and then validating the matches in a post-hoc manner. This algorithm involves three stages: 1) discretization and element reorganization to form a proxy integer problem; 2) tabulation, i.e. building DP tables; and 3) backtracking tables until a valid match is found. The DP solver is shown in algorithm 900, and FIG. 10 is an illustration 1000 of the algorithm with an example.

Discretization and Element Reorganization: Variables $\bar{a}=[\bar{a}_1, \ldots, \bar{a}_M]$ and $\bar{b}=[\bar{b}_1, \ldots, \bar{b}_N]$ are used to represent the elements of a,b after applying discretization $\bar{a}=\text{round}(\rho a)$, $\bar{b}=\text{round}(\rho,b)$, where $\rho>0$ is a scale. Then, all the elements are reorganized in $\bar{a},\bar{b}$ into two groups of positive integers:

$$\eta = [\bar{a}:\bar{a} > 0, a \in \bar{a}] \oplus [-\bar{b}:\bar{b} < 0, \bar{b} \in \bar{b}] \qquad \text{(Expression 17)}$$

$$\lambda = [-\bar{a}:\bar{a} < 0, a \in \bar{a}] \oplus [\bar{b}:\bar{b} > 0, \bar{b} \in \bar{b}] \qquad \text{(Expression 18)}$$

The variables $\eta$ and $\lambda$ are used to form a new problem SSMP⁻($\eta,\lambda,\in^-$), where each element in $\eta$ and $\lambda$ corresponds to one and only one element in a or b. Let $M'=|\eta|$ and $N'=|\lambda|$, this yields $M'+N'=M+N$. The new matching threshold $\in^-$ is chosen to be the smallest integer that guarantees every solution of the original SSMP⁻(a, b, $\in$) can be recovered from a solution of SSMP⁻($\eta,\lambda,\in^-$). $\in^-$ is defined as:

$$\epsilon^- = \lceil \rho \epsilon (M + n)/2 \rceil \qquad \text{(Expression 19)}$$

where $\rho \in$ is a scaled-up item of $\in$ and (M+N)/2 is the maximum effect caused by the rounding function.

Tabulation: Two tables $T_\eta$, $T_\lambda$ are created for storing the feasibility of achieving a certain subset sum from elements in $\eta,\lambda$ respectively. Taking $T_\eta$ as an example, the number of rows is equal to M' while the number of columns is X+1 where X is the largest subset value that can be matched across sides, i.e., $X=\min(\Sigma_{m=1}^{M'}\eta_m, \Sigma_{n'=1}^{N'}\lambda_{n'})$. Each entry $T_\eta[m', i]$ represents whether the subset sum i can be computed with the first m' elements in $\eta$ (m'$\in$[1,M'],i$\in$[0,X]). The table is updated with:

$$T_\eta[m', i] = \begin{cases} \text{false if } m' = 1 \text{ and } i \neq \eta_1 & \text{(Expression 20)} \\ \text{true if } i = \eta_{m'} \text{ or } i = 0 \\ T_\eta[m' - 1, i] \lor T_\eta[m' - 1, i - \eta_{m'}] \ o.w. \end{cases}$$

Tree Search and Matching: With the tables $T_\eta$, $T_\lambda$, the matching procedure compares the last row of each table to find the matched subset sums within tolerance $\in^-$:

$$\mathcal{H} = \mathcal{H}_0 \cup \mathcal{H}_1 \cup \cdots \cup \mathcal{H}_{\bar{\epsilon}} \qquad \text{(Expression 21)}$$

where $$\mathcal{H}_e = \{(i, j):T_\eta[M', i] \land T_\lambda[N', j] = \text{true}, |i - j| = e\} \qquad \text{(Expression 22)}$$

Each (i,j) satisfying this condition would lead to at least one subset in $(\eta, \lambda)$ whose sum is equal to (i, j). The corresponding subset(s) can be discovered by back-tracking in the table via a binary search tree. These binary search trees start with the root node located in the last row of the DP table and follow Expression (20) in the reverse direction; for a tree node $T_\eta[m', x]$, if its value is true, then $T_\eta[m'-1, x]$, $T_\eta[m'-1, x-\eta_m]$ are its two child nodes, if it exists. A pruning rule is used to terminate searching that branch when: 1) the value of a node is false; or 2) the column index of the node in the table is zero (0).

FIG. 10 shows examples of binary trees. The search path leading to each leaf node whose value is true uniquely links to a subset corresponding to the target subset sum.

For each pair $(i,j) \in H$, a binary tree search starting at $T_\eta[M', i]$ and $T_\lambda[N', j]$ brings two groups of subsets and each combination between the two groups, denoted as $\langle \eta_p \lambda_q \rangle$. $p \in \{0,1\}^{M'}$ and $q \in \{0,1\}^{N'}$ are the vectors for describing subsets of $\eta$ and $\lambda$, which uniquely link to a potential match $\langle a_w, b_v \rangle$, by reversing the reorganization process, to the original $SSSMP^-(a, b, \in)$.

Referring to FIG. 10, an illustration 100 of the DP approach with the same example as shown in FIG. 8 is provided. Discretization and Element Reorganization: In this example, converting real numbers to integers via $\rho=2$. Tabulation: Two tables are created from $\eta=[9, 4, 2]$, $\lambda=[5, 11, 6, 1]$. Tree Search and Matching: An example of a tree structure is shown. The first tree with root node $T_\eta[3,6]$ returns one subset of $\eta$ which links to $[b_1, b_4]$. The tree starting from $T_\lambda[4,6]$ returns $\lambda$ subsets of linking to $[b_2, a_3]$ and $[a_1]$. After validation, only the combination of $[b_1, b_4]$ and $[a_1]$ makes a valid match. Equivalently, w=[1,0, 0], v=[1, 0, 0, 1].

Accordingly, with this technology, an optimized process for performing a combinatorial optimization task that relates to finding subsets of matching sums of items that are associated with two parties in an efficient and cost-effective manner is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for performing a combinatorial optimization task that relates to finding matching digital subsets among items that are associated with two parties, the method being implemented by at least one processor, the method comprising:

implementing a Subset Sum Matching Problem Solver (SSMPS) program with a first algorithm comprising a sub-optimal combinatorial optimization algorithm and a memory search-based algorithm, and a second algorithm comprising a dynamic programming pseudo-polynomial algorithm, wherein the SSMPS program operates via a virtual server in a cloud-based computing environment;

receiving, a digital first set of data items that relate to respective characteristics of a first situation, and executing the SSMPS program that virtually discretizes each of the digital first set of data items to generate a digital first discretized set of data items;

receiving a digital second set of data items that relate to respective characteristics of a second situation, and executing the SSMPS program that virtually discretizes each of the digital second set of data items in order to generate a digital second discretized set of data items;

executing the SSMPS program that virtually reorganizes the digital first and second discretized sets of data items into two respective groups of positive integers;

executing the SSMPS program that virtually generates two respective digital tables based on the two respective groups of positive integers that stores a feasibility of obtaining at least one digital subset sum match from among elements of the digital first and second discretized sets of data items;

executing the SSMPS program that virtually performs a digital subset sum matching procedure based upon the two respective digital tables to virtually identify the at least one digital subset sum match;

executing the SSMPS program that virtually divides the digital first discretized set of data items into a digital first subset that includes all elements having values greater than zero and a digital second subset that includes all elements having values less than zero, and generating a digital third subset that includes absolute values of all elements of the digital second subset;

executing the SSMPS program that virtually divides the digital second discretized set of data items into a digital fourth subset that includes all elements having values greater than zero and a digital fifth subset that includes all elements having values less than zero, and generating a digital sixth subset that includes absolute values of all elements of the digital fifth subset;

executing the SSMPS program that virtually performs a first vector concatenation operation between the digital first subset and the digital sixth subset to generate a first one of the two respective groups of positive integers; and executing the SSMPS program that virtually performs a second vector concatenation operation between the digital third subset and the digital fourth subset to generate a second one of the two respective groups of positive integers.

2. The method of claim 1, further comprising:

executing the SSMPS program that virtually selects a value for a matching threshold, wherein the executing the SSMPS program that virtually performs the digital subset sum matching procedure comprises a virtual determination on whether a difference between a digital subset sum that corresponds to the digital second discretized set of data items and a digital subset sum that corresponds to the digital first discretized set of data items is less than the virtually selected value for the matching threshold.

3. The method of claim 1, wherein the executing the SSMPS program that virtually performs the digital subset sum matching procedure further comprises executing the SSMPS program to virtually validate the virtually identified at least one digital subset sum match.

4. The method of claim 1, wherein for each of the two respective digital tables, a number of columns is equal to a largest subset value that is matchable between the two respective groups of positive integers plus one; and for a first one of the two respective digital tables, a number of rows is equal to a number of elements included in a first one of the two respective groups of positive integers; and for a second one of the two digital respective tables, a number of rows is equal to a number of elements included in a second one of the two respective groups of positive integers.

5. The method of claim 4, wherein the executing the SSMPS program that virtually performs the digital subset sum matching procedure comprises a virtual comparison of a last row of the first one of the two respective digital tables with a last row of the second one of the two respective digital tables to virtually identify at least one ordered pair of values that corresponds to a digital matching pair of subset sums from among the digital first and second discretized sets of data items.

6. The method of claim 5, wherein the executing the SSMPS program that virtually performs the digital subset sum matching procedure further comprises using the at least one ordered pair to apply a binary tree search to each of the two respective digital tables to virtually determine the digital matching pair of subset sums.

7. The method of claim 1, wherein the first situation relates to a first set of digital records that is associated with a first party from among the two parties, and the second situation relates to a second set of digital records that is associated with a second party from among the two parties.

8. A computing apparatus for performing a combinatorial optimization task that relates to finding matching digital subsets among items that are associated with two parties, the computing apparatus comprising:

a processor;

a memory; and a communication interface coupled to each of the processor and the memory, wherein the processor is configured to:

implement a Subset Sum Matching Problem Solver (SSMPS) program with a first algorithm comprising a sub-optimal combinatorial optimization algorithm and a memory search-based algorithm, and a second algorithm comprising a dynamic programming pseudo-polynomial algorithm, wherein the SSMPS program operates via a virtual server in a cloud-based computing environment;

receive, via the communication interface, a digital first set of data items that relate to respective characteristics of a first situation, and execute the SSMPS program that virtually discretizes each of the digital first set of data items to generate a digital first discretized set of data items;

receive, via the communication interface, a digital second set of data items that relate to respective characteristics of a second situation, and execute the SSMPS program that virtually discretizes each of the digital second set of data items to generate a digital second discretized set of data items;

execute the SSMPS program that virtually reorganizes the first and second discretized sets of data items into two respective groups of positive integers;

execute the SSMPS program that virtually generates two respective digital tables based on the two respective groups of positive integers that stores a feasibility of obtaining at least one digital subset sum match from among elements of the digital first and second discretized sets of data items;

execute the SSMPS program that virtually performs a digital subset sum matching procedure upon the two respective digital tables to virtually identify the at least one digital subset sum match;

execute the SSMPS program that virtually divides the digital first discretized set of data items into a digital first subset that includes all elements having values greater than zero and a digital second subset that includes all elements having values less than zero, and generating a digital third subset that includes absolute values of all elements of the digital second subset;

execute the SSMPS program that virtually divides the digital second discretized set of data items into a digital fourth subset that includes all elements having values greater than zero and a digital fifth subset that includes all elements having values less than zero, and generating a digital sixth subset that includes absolute values of all elements of the digital fifth subset;

execute the SSMPS program that virtually performs a first vector concatenation operation between the digital first subset and the digital sixth subset to generate a first one of the two respective groups of positive integers; and execute the SSMPS program that virtually performs a second vector concatenation operation between the digital third subset and the digital fourth subset to generate a second one of the two respective groups of positive integers.

9. The computing apparatus of claim 8, wherein the processor is further configured to:

executing the SSMPS program that virtually selects a value for a matching threshold; and executing the SSMPS program that virtually determines, as a part of the digital subset sum matching procedure, whether a difference between a digital subset sum that corresponds to the digital second discretized set of data items and a digital subset sum that corresponds to the digital first discretized set of data items is less than the virtually selected value for the matching threshold.

10. The computing apparatus of claim 8, wherein the processor is further configured to execute the SSMPS program to virtually validate the virtually identified at least one digital subset sum match.

11. The computing apparatus of claim 8, wherein for each of the two respective digital tables, a number of columns is equal to a largest subset value that is matchable between the two respective groups of positive integers plus one; and for a first one of the two respective digital tables, a number of rows is equal to a number of elements included in a first one of the two respective groups of positive integers; and for a second one of the two respective digital tables, a number of rows is equal to a number of elements included in a second one of the two respective groups of positive integers.

12. The computing apparatus of claim 11, wherein as a part of the digital subset sum matching procedure, the processor is further configured to;

execute the SSMPS program that virtually compares a last row of the first one of the two respective digital tables with a last row of the second one of the two respective digital tables to virtually identify at least one ordered pair of values that corresponds to a digital matching pair of subset sums from among the digital first and second discretized sets of data items.

13. The computing apparatus of claim 12, wherein the processor is further configured to:

execute the SSMPS program that virtually uses the at least one ordered pair to apply a binary tree search to each of the two respective digital tables to virtually determine the digital matching pair of subset sums.

14. The computing apparatus of claim 8, wherein the first situation relates to a first set of digital records that is associated with a first party from among the two parties, and the second situation relates to a second set of digital records that is associated with a second party from among the two parties.

15. A non-transitory computer readable storage medium storing instructions for performing a combinatorial optimization task that relates to finding matching digital subsets among items that are associated with two parties, the storage medium comprising executable code which, when executed by a processor, causes the processor to:

implement a Subset Sum Matching Problem Solver (SSMPS) program with a first algorithm comprising a sub-optimal combinatorial optimization algorithm and a memory search-based algorithm, and a second algorithm comprising a dynamic programming pseudo-polynomial algorithm, wherein the SSMPS program operates via a virtual server in a cloud-based computing environment;

receive a digital first set of data items that relate to respective characteristics of a first situation, and executing the SSMPS program that virtually discretizes each of the digital first set of data items to generate a digital first discretized set of data items;

receive a digital second set of data items that relate to respective characteristics of a second situation, and executing the SSMPS program that virtually discretizes each of the digital second set of data items to generate a digital second discretized set of data items;

execute the SSMPS program that virtually reorganizes the digital first and second discretized sets of data items into two respective groups of positive integers;

execute the SSMPS program that virtually generates two respective digital tables based on the two respective groups of positive integers that stores a feasibility of obtaining at least one digital subset sum match from among elements of the digital first and second discretized sets of data items;

execute the SSMPS program that virtually performs a digital subset sum matching procedure upon the two respective digital tables to virtually identify the digital at least one subset sum match;

execute the SSMPS program that virtually divides the digital first discretized set of data items into a digital first subset that includes all elements having values greater than zero and a digital second subset that includes all elements having values less than zero, and generating a digital third subset that includes absolute values of all elements of the digital second subset;

execute the SSMPS program that virtually divides the digital second discretized set of data items into a digital fourth subset that includes all elements having values greater than zero and a digital fifth subset that includes all elements having values less than zero, and generating a digital sixth subset that includes absolute values of all elements of the digital fifth subset;

execute the SSMPS program that virtually performs a first vector concatenation operation between the digital first subset and the digital sixth subset to generate a first one of the two respective groups of positive integers; and execute the SSMPS program that virtually performs a second vector concatenation operation between the digital third subset and the digital fourth subset to generate a second one of the two respective groups of positive integers.

16. The storage medium of claim 15, wherein when executed by the processor, the executable code further causes the processor to:

execute the SSMPS program that virtually selects a value for a matching threshold; and execute the SSMPS program that virtually determines, as a part of the digital subset sum matching procedure, whether a difference between a digital subset sum that corresponds to the digital second discretized set of data items and a digital subset sum that corresponds to the digital first discretized set of data items is less than the virtually selected value for the matching threshold.

17. The storage medium of claim 15, wherein when executed by the processor, the executable code further causes the processor to: execute the SSMPS program to virtually validate the virtually identified at least one digital subset sum match.

* * * * *